(12) United States Patent
Buck et al.

(10) Patent No.: US 9,519,747 B1
(45) Date of Patent: Dec. 13, 2016

(54) DYNAMIC AND ADAPTIVE TIMING SENSITIVITY DURING STATIC TIMING ANALYSIS USING LOOK-UP TABLE

(71) Applicant: GLOBALFOUNDRIES INC., Grand Cayman (KY)

(72) Inventors: Nathan Buck, Underhill, VT (US); Brian M. Dreibelbis, Underhill, VT (US); John P. Dubuque, Jericho, VT (US); Eric A. Foreman, Fairfax, VT (US); David J. Hathaway, Underhill, VT (US); Jeffrey G. Hemmett, St. George, VT (US); Kerim Kalafala, Rhinebeck, VT (US); Gregory M. Schaeffer, Poughkeepsie, NY (US); Stephen G. Shuma, Underhill, VT (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/751,222

(22) Filed: Jun. 26, 2015

(51) Int. Cl.
*G06F 17/50* (2006.01)

(52) U.S. Cl.
CPC ....... *G06F 17/5081* (2013.01); *G06F 17/5022* (2013.01); *G06F 17/5031* (2013.01); *G06F 2217/84* (2013.01)

(58) Field of Classification Search
CPC .............. G06F 17/5022; G06F 17/5031; G06F 2217/84

(Continued)

(56) References Cited

U.S. PATENT DOCUMENTS

| 7,979,825 | B2 | 7/2011 | Elfadel et al. |
| 2008/0209373 | A1 | 8/2008 | Buck et al. |

(Continued)

FOREIGN PATENT DOCUMENTS

| WO | 9820397 A1 | 5/1998 |
| WO | 2009147504 A1 | 12/2009 |

OTHER PUBLICATIONS

Grass et al; "Control of Expression of a Periplasmic Nickel Efflux Pump by Periplasmic Nickel Concentrations", Biometals18, No. 4, 2005, pp. 437-448.

*Primary Examiner* — Stacy Whitmore
(74) *Attorney, Agent, or Firm* — Gibb & Riley, LLC; David A. Cain, Esq.

(57) ABSTRACT

Methods and systems receive an integrated circuit design into a computerized device and perform an analysis of the integrated circuit design to identify characteristics of physical features of portions of the integrated circuit design. Such methods and systems determine whether to look up sensitivity of a timing value of a portion of the integrated circuit design to manufacturing process variables, voltage variables, and temperature variables (PVT variables) by: evaluating relationships between the characteristics of physical features of the portion of the integrated circuit design to generate an indicator value; and, based on whether the indicator value is within a table usage filter value range, either: calculating the sensitivity of the timing value to the PVT variables; or looking up a previously determined sensitivity of the timing value to the PVT variables from a look-up table.

20 Claims, 6 Drawing Sheets

(58) Field of Classification Search
USPC .......................... 716/106, 108, 110–111, 113
See application file for complete search history.

(56) References Cited

U.S. PATENT DOCUMENTS

| | | |
|---|---|---|
| 2009/0013294 A1 | 1/2009 | Visweswariah |
| 2009/0307645 A1 | 12/2009 | Buck et al. |
| 2010/0095259 A1* | 4/2010 | Tetelbaum ........... G06F 17/5031 716/113 |
| 2013/0283223 A1 | 10/2013 | Agrawal et al. |
| 2014/0089881 A1* | 3/2014 | Tetelbaum ........... G06F 17/5031 716/113 |

* cited by examiner

DYNAMIC AND ADAPTIVE TIMING SENSITIVITY DURING STATIC TIMING ANALYSIS USING LOOK-UP TABLE

BACKGROUND

The present embodiments relate to static timing analysis, and more specifically to using variable accuracy parameter modeling in statistical static timing analysis.

One form of performance analysis that is used during integrated circuit (IC) design is static timing analysis (STA). Static timing analysis identifies circuit races/hazards that could cause a chip to malfunction, verifies the operational speed of a chip, and identifies the paths, which limit the operational speed of the integrated circuit. Static timing analysis typically operates on a timing graph, in which graph nodes represent electrical nodes (e.g., circuit pins) where signals may make transitions at various times; and in which graph edges, or segments, representing the delays of the circuits and/or wires connecting the nodes. Although static timing analysis may report performance-limiting paths, typical static timing analysis methods may not actually operate on paths (of which there may be an exponentially large number), and instead can be "block-based" to compute and propagate forward signal arrival times reflecting the earliest and/or latest possible times that signal transitions can occur at nodes in the timing graph. As a result, static timing analysis is efficient, allowing for rapid estimation of circuit timing on very large designs as compared to other approaches (e.g., transient simulation).

One aspect of static timing analysis is evaluation of timing tests, which are ordering relationships between the arrival times of signals on converging paths. These are often represented in a timing graph as test edges, or segments. Common examples of timing tests are setup tests, requiring that a data signal at an input of a flip-flop or other memory element becomes stable for some setup period before the clock signal transition that stores that data (i.e., that the latest possible data transition in a clock cycle occur at least the required setup period before the earliest possible clock transition for that cycle); and hold tests, requiring that a data signal at an input of a flip-flop or other memory element remain stable for some hold period before the clock signal transition that stores that data (i.e., that the earliest possible data transition in a clock cycle occur at least the required hold period after the latest possible clock transition for the preceding clock cycle). Pairs of paths along which early and late arrival times compared in a timing test are propagated are often referred to as racing paths.

It is commonly recognized that electrical characteristics of transistors and interconnects are not the same for different IC chips and even for the same chip at different periods of time or chip locations. Variation of electrical characteristics can be due to variation of process parameters, changing of environmental conditions and even chip age (e.g., Hot Carriers Injections, Negative Bias Temperature Instability, electromigration, and so forth). The variation of electrical characteristics results in variations of gate timing characteristics. Traditional deterministic static timing analysis may typically be performed at a particular "corner," which is a specified combination of conditions such as voltage, temperature, and manufacturing process (PVT) that affect delays of circuits on a chip. However, the timing results can vary widely between corners as changes in temperature, voltage, process, etc., can have a strong affect on the delays through the chip components. The traditional conservative way to handle these variations is to perform multiple static timing analysis runs at all so-called process corners at which the gates may have the worst combinations of delays, sometimes referred to as base corners. In other words, base corners may be best case, nominal, and worst case settings for variables (such as PVT, etc.). Then chips are designed so that they can properly function at all process corners assuming that as a result they will function at any other combination of gate delays.

However, with decreasing transistor size and interconnect width, the variation of electrical characteristics is becoming proportionally larger. Therefore, the multi-corner analysis approach results in too conservative and non-optimal designs because most design efforts and chip resources are spent to make chips function at very low-probability combinations of electrical characteristics. Additionally, the fixing of failed timing tests in one process corner may lead to new timing test failures in other corners, requiring a costly iterative design process. An alternative approach to designing chips is to consider actual statistical characteristics of process parameter variations and use them to compute statistical characteristics of a designed circuit. This approach is referred to as the Statistical Static Timing Analysis (SSTA) approach.

There are various categories of SSTA processes: path-based and block-based methods. A path-based SSTA process sums gate and wire delays on specific paths. The statistical calculation uses less computing resources, but the paths of interest are identified prior to running the analysis, which takes time, and there is the potential that some other paths may be relevant but not analyzed so path selection is important. A block-based SSTA process generates the arrival times for each node, working from the clocked elements. The advantage of a block-based SSTA process is completeness, and there is no need for path selection. One issue with SSTA is that a statistical max (or min) operation, that also considers correlation, would be useful; however, this is a difficult technical problem to achieve.

Statistical static timing analysis explicitly propagates mean timing values and sensitivities of these mean timing values to sources of variation through the timing graph, based on modeled variability information contained in asserted timing constraints and the delay models. These sensitivities may then cancel when arrival time differences are computed at test slack calculation time, providing pessimism reduction during the original block based timing analysis. Statistical min/max operations are used to compute the early and late mode arrival times, respectively, when paths converge, including computing both new mean values and sensitivities to various parameters. As the distributions propagated represent functions rather than discrete numerical values, operations such as addition and subtraction, and in particular max and min, can be very computationally extensive and expensive as compared to traditional deterministic timing. Regardless of the timing approach used, the runtime required to perform timing analysis impacts the number of design iterations, and there is strong interest in keeping the runtime to a minimum. Therefore, methods that can reduce runtime while maintaining timing accuracy are desirable.

Thus, sensitivities are computed for every timing quantity. Typically this is done with the finite-difference technique, and includes: rise/fall/early/late for delay, slew, and for each statistical source of variation. This also gets multiplied for each unique clock/phase and propagated. Also, SSTA uses a canonical model to analyze variation. The vector of data within the canonical model can be computationally expensive to create, store, and propagate, which results in an increase in runtime and memory requirements.

SUMMARY

In view of the foregoing, disclosed herein are methods, systems, and computer program products embodiments (sometimes referred to herein simply as "methods" for brevity) that create look-up tables of previously determined timing value sensitivities with respect to characteristics of physical features (e.g., sizes of physical features, electrical characteristics of physical features, etc.) of portions of integrated circuit designs.

These methods receive an integrated circuit design into a computerized device and perform an analysis of the integrated circuit design to identify characteristics of physical features of portions of the integrated circuit design, using the computerized device. Instead of always calculating sensitivities of timing values, the methods herein potentially use the look-up tables to look up the sensitivity of a timing value of a portion of the integrated circuit design. Such calculations, or look up operations, find the sensitivities of timing values to manufacturing process variables, voltage variables, and temperature variables (PVT variables), again using the computerized device.

More specifically, when determining whether to use the look-up tables, these methods evaluate relationships between the characteristics of physical features of the portion of the integrated circuit design to generate an indicator value. For example, when evaluating the relationships between the characteristics of physical features of the portion of the integrated circuit design, these methods can calculate ratios of physical sizes, ratios of electrical values, ratios of timing values, etc., of the physical features. As described below, the indicator value generated in this process is used for determining whether to look up the sensitivity of the timing value to the PVT variables in the look-up tables, or whether to calculate the sensitivity of the timing value to the PVT variables.

Therefore, based on whether the indicator value is within a threshold range (e.g., a table usage filter value range) these methods either calculate the sensitivity of the timing value to the PVT variables, or look up a previously determined sensitivity of the timing value to the PVT variables from the look-up tables. When actually calculating the sensitivity of the timing value to the PVT variables, these methods can perform any number of calculations, including finite differences modeling, current source modeling, non-linear delay modeling, etc.

Additionally, when determining whether the indicator value is within the table usage filter value range, these methods herein can also refer to previously established sensitivity importance criteria. The previously established sensitivity importance criteria cause the methods herein to use different table usage filter value ranges for different portions of the integrated circuit design. Therefore, these previously established sensitivity importance criteria allow the analyst to tune the methods herein so that portions of the integrated circuit design that are considered critical, or that historically have an above-average number of defects, will always (or almost always) have the timing sensitivity calculated, instead of being looked up; while other less critical portions of the integrated circuit design can acceptably use the look-up tables for timing sensitivities. Such previously established sensitivity importance criteria can be different for different physical layers of the integrated circuit design, different physical locations of the integrated circuit design, different materials within the integrated circuit design, different parameters of the PVT variables, etc.

Further, these methods can constantly update the look-up table while determining the sensitivity of the timing value to the PVT variables, thereby allowing these processes to be dynamic and adaptive as the analysis of the integrated circuit design proceeds. For example, these methods can update the look-up table by using results from when the processing determines that the sensitivity of the timing value to the PVT variables should be calculated, instead of being looked up. Thus, when the sensitivity of the timing value to the PVT variables is actually calculated (instead of being looked up), the results of such calculations can update the look-up tables to add additional timing sensitivities related to additional relationships between the characteristics of physical features that were not previously stored in the look-up tables, or such calculations can be used to refine previously stored timing sensitivities that were previously saved to the look-up tables.

BRIEF DESCRIPTION OF THE SEVERAL VIEWS OF THE DRAWINGS

The present embodiments will be better understood from the following detailed description with reference to the drawings, which are not necessarily drawn to scale and in which.

DETAILED DESCRIPTION

As noted above, the vector of data within the canonical model can be computationally expensive to create, store, and propagate, which results in an increase in runtime and memory requirements. The systems and methods presented below improve runtime and memory, while maintaining accuracy.

The systems and methods herein provide a dynamic and adaptive method for including sensitivities in SSTA models. With this method finite differencing is skipped and asserted sensitivities are not blindly added. The method replaces a computed sensitivity with an asserted sensitivity. This further can be done 'on-the-fly' during timing propagation and the asserted sensitivity can be either user supplied, dynamically determined, a table lookup or a combination. Also the methods herein are adaptive, where the user can populate a sensitivity table during propagation and once a table is propagated, then more replacements can occur based on the characteristics of the item being analyzed. The characteristics of the items in the table could, for example, be the metal cap/layer. In this event, the method which detects a metal filter will compare wire RC vs. pincap and if the ratio is small, then the methods use asserted sensitivity from a table. The method can use parameter selection ordering/weighting for which steps to skip, for example parameters with higher importance can be selected first and the filter criteria can be set for each unique parameter.

Additionally, embodiments herein can use of cached sensitivities for the purpose of computing canonical cell delay (e.g. if two instances of the same cell type have matching input slew and output load, then the systems and methods re-use, i.e., assert, both front-end and back-end sensitivities previously computed for cell type 1 during the analysis of cell type 2).

Also, the systems and methods herein provide an order-dependency of run-to-run differences in the case where recycled sensitivities do not exactly match the "actual" sensitivities that would be obtained through a full finite-difference step. For example, this can occur in the case where instance 1 and instance 2 "match" in so far as recycling sensitivities. Here, the systems and methods see a different result because they first compute sensitivities for instance 1 and then reuse those for instance 2, as opposed to the case where the systems and methods first compute sensitivities for instance 2 and then re-use those for instance 1 (such order differences may occur due to multi-threading if instance 1 and instance 2 do not directly depend on each other). Additionally, to avoid order-dependent results, some systems and methods herein provide strict-ordering criteria (e.g., instance 2 can only recycle results from instance 1 if instance 2 is in the fan-out cone of instance 1).

Figure 1:
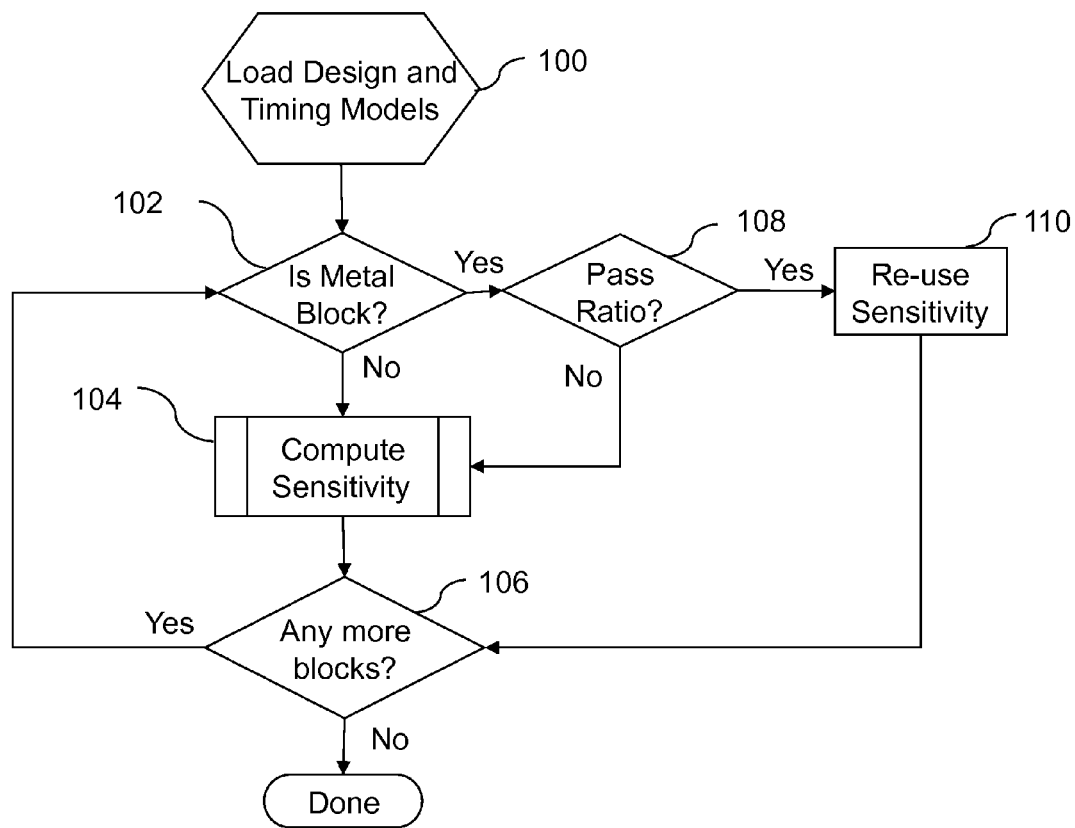
FIG. 1 is a flowchart diagram illustrating aspects of systems and methods herein.

One form of this processing is shown in flowchart form in FIG. 1. More specifically, in item 100 the process loads the design and timing models. In this example, the systems and methods herein determine whether a specific portion of the integrated circuit design is a metal block, as seen in item 102. If the process determines that 'no' the specific portion of the integrated circuit design is not a metal block, the process moves to item 104, where the timing sensitivity is computed.

To the contrary, if the systems and methods determine in item 102 that 'yes' the feature is a metal block, the process moves to item 108, where it is determined whether a ratio of characteristics of the metal block passes a filter. In item 108, if the ratio is not passed the process again moves to item 104, where the timing sensitivity is also computed. If the ratio is passed in item 108, the process moves to item 110 where the process re-uses a previous timing sensitivity that is maintained in a look-up table.

Processing moves to item 106, where the systems and methods determine whether there are any more blocks to analyze. If 'no' the process is finished, however if 'yes' the process loops back to item 102, where it is again determined whether the block is metal.

Figure 2:
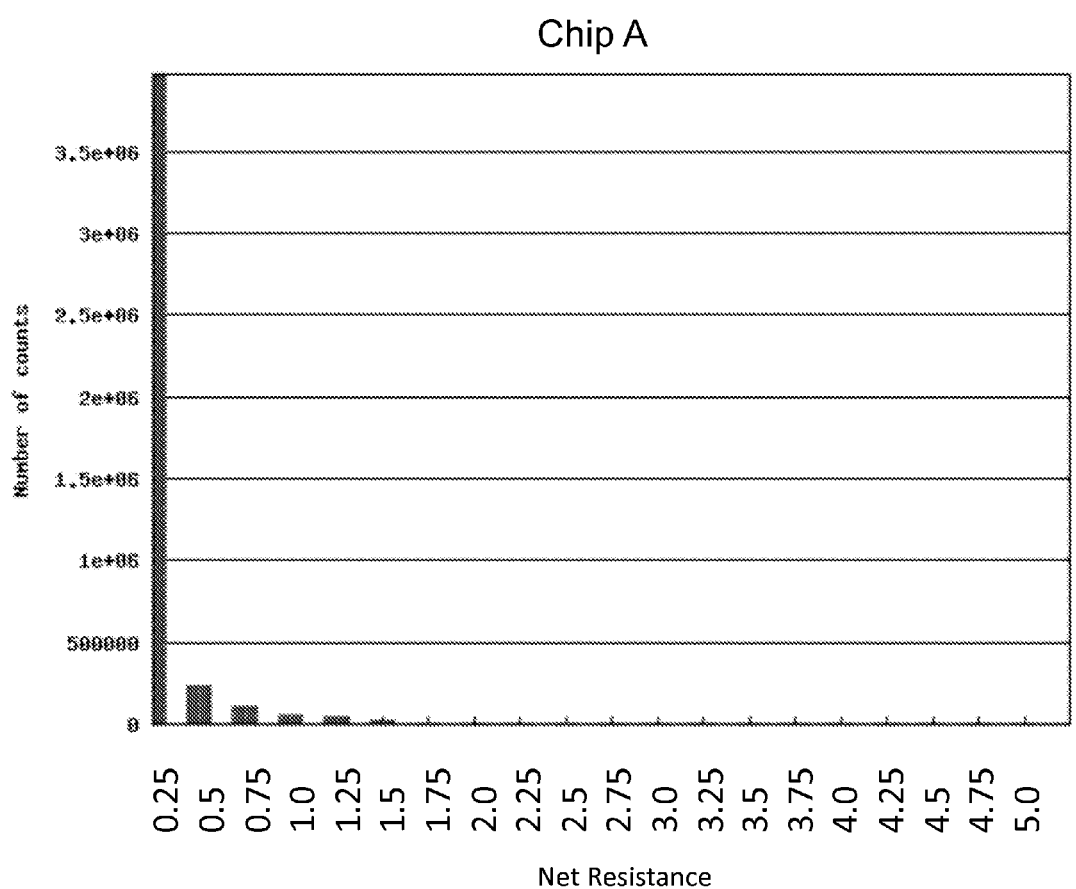
FIG. 2 is a graph illustrating net resistance data.
Figure 3:
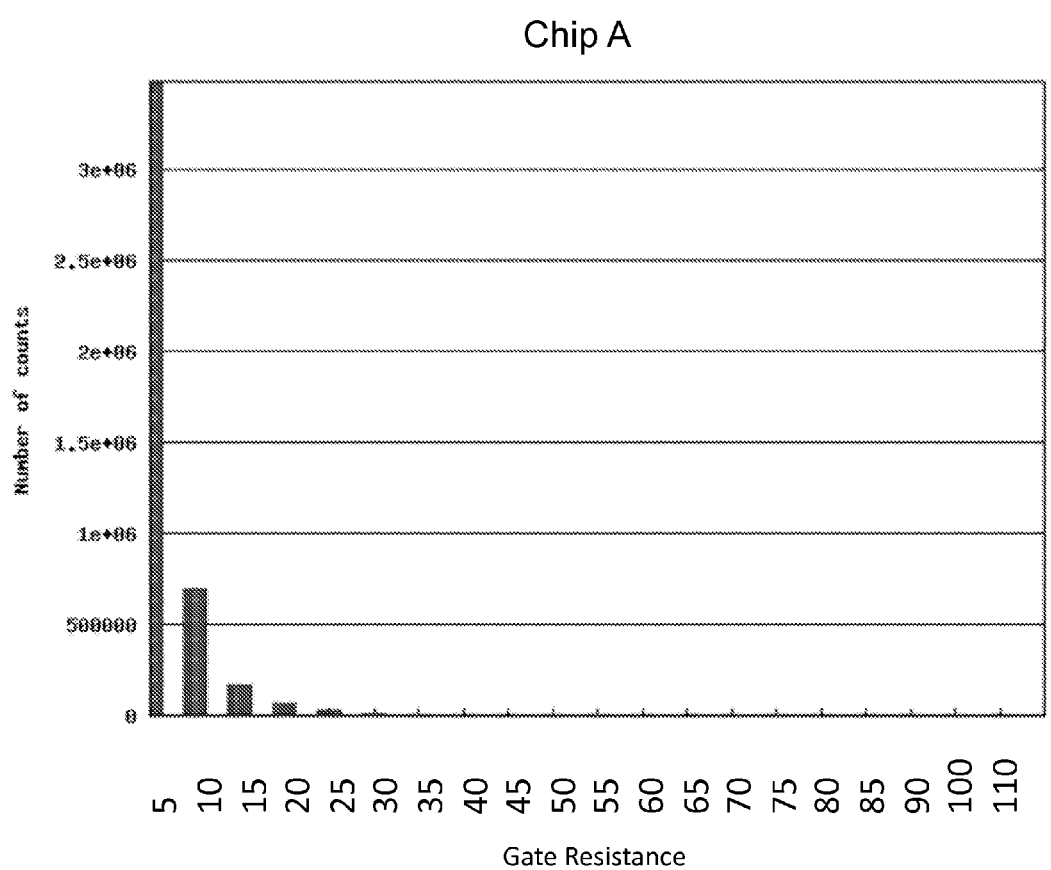
FIG. 3 is a graph illustrating gate resistance data.
Figure 4:
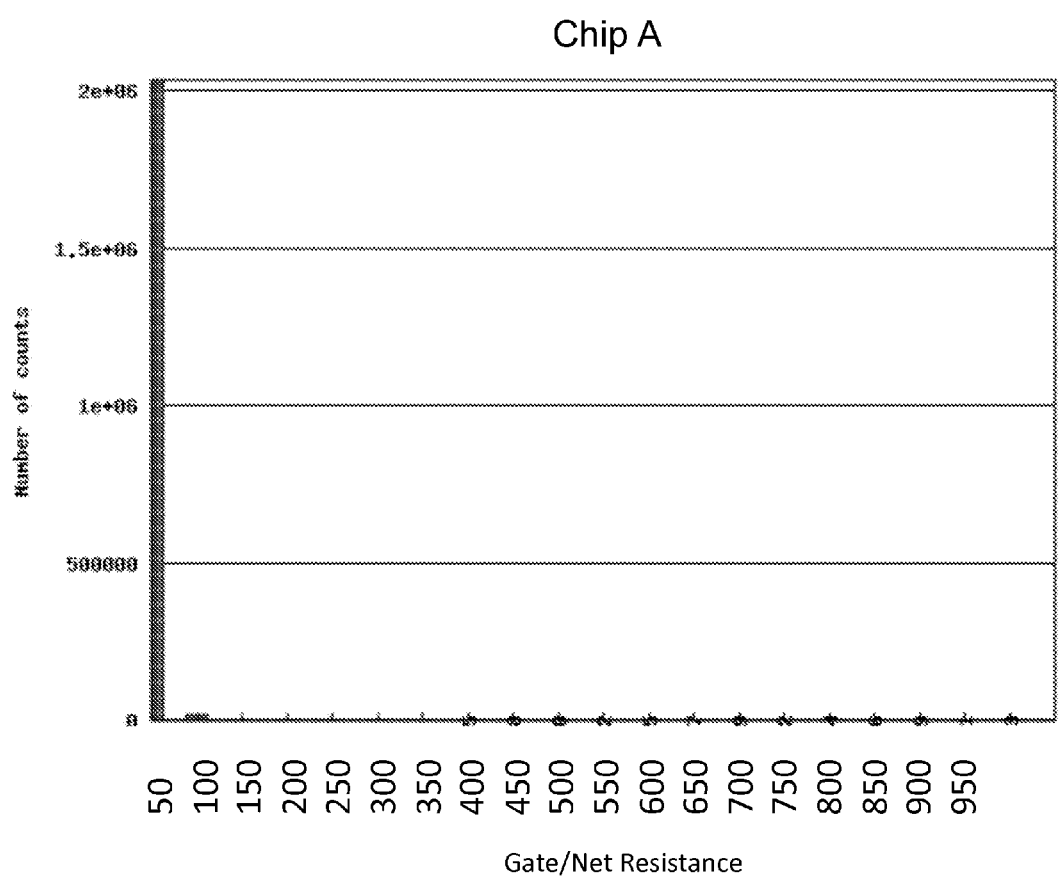
FIG. 4 is a graph illustrating gate/net ratio resistance data.

FIGS. 2-4 illustrate characteristics of physical features of the portion of the integrated circuit design and relationships between the characteristics of physical features. More specifically, FIG. 2 is a graph illustrating net resistance data, FIG. 3 is a graph illustrating gate resistance data, and FIG. 4 is a graph illustrating gate/net ratio resistance data. Therefore, FIGS. 2 and 3 illustrate two characteristics of physical features of the portion of the integrated circuit design (those characteristics being resistance data) and the physical features (those physical features being a gate and a net). While resistance data of a gate and a net are used in this example, those ordinarily skilled in the art would understand that the embodiments herein are applicable to all physical features of an integrated circuit design including, but not limited to, substrates, wiring, transistors, resistors, diodes, capacitors, conductors, semiconductors, insulators, etc. Similarly, the characteristics evaluated by embodiments herein are not limited to resistance, but include any and all characteristics including, but not limited to, physical sizes, electrical values, timing values, etc.

As can be seen in FIG. 4, the systems and methods herein determine whether to use the look-up tables by evaluating relationships between the characteristics of physical features of the portion of the integrated circuit design. In the example in FIG. 4, the relationship between the characteristics is the gate/net ratio of resistance data. Further, FIG. 4 illustrates the indicator value (e.g., 50 in FIG. 4) that is generated from the relationships between the characteristics of physical features. This indicator value is then compared to see if the indicator value is within a threshold range (e.g., a table usage filter value range), and this determines whether to use the look-up table or perform actual calculations to find the timing sensitivity.

Figure 5:
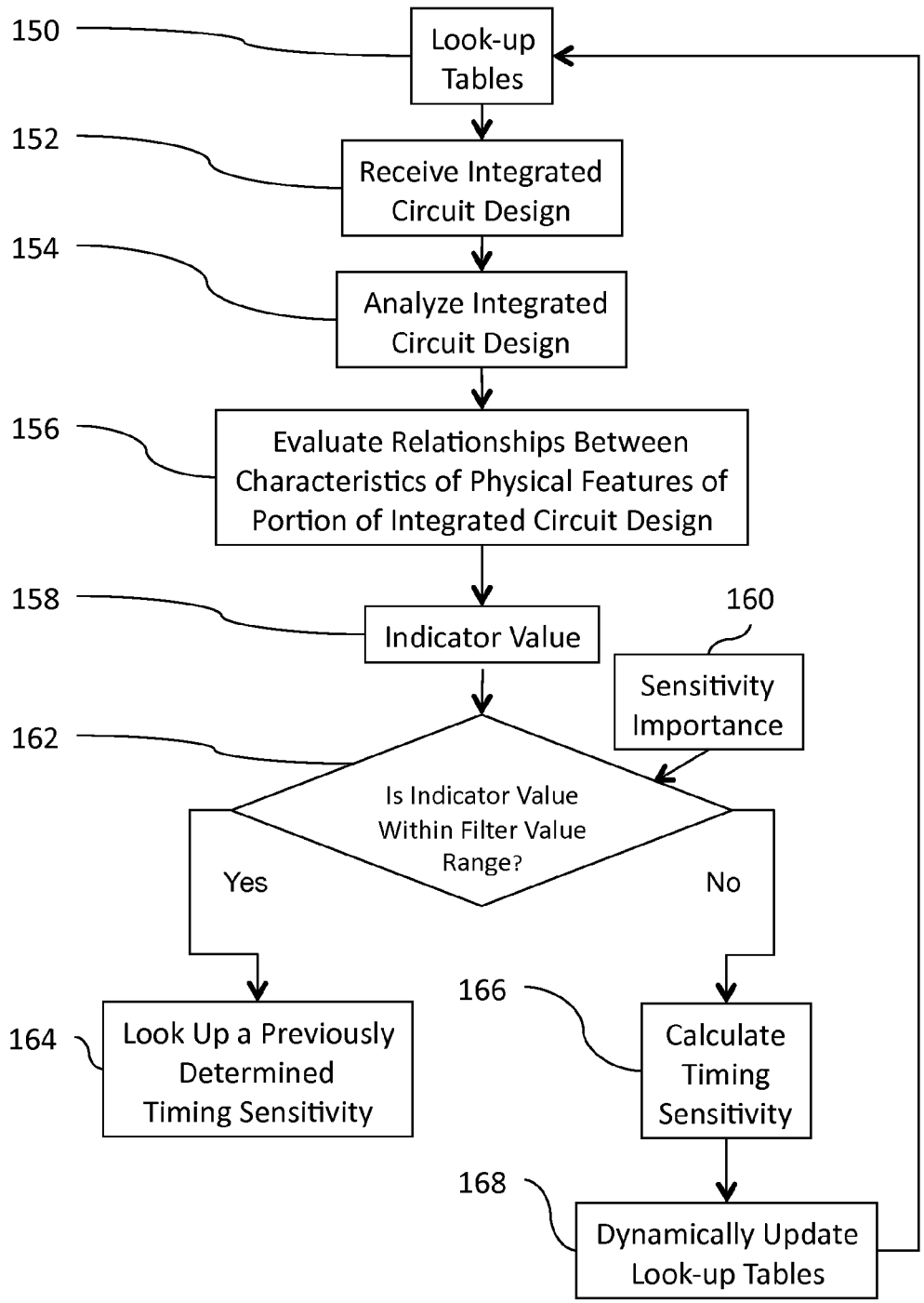
FIG. 5 is a flowchart diagram illustrating aspects of systems and methods herein.

FIG. 5 is a flowchart illustrating other aspects of methods, systems, and computer program products embodiments. As shown in item 150, these methods create look-up tables. The look-up tables store previously determined timing value sensitivities with respect to characteristics of physical features (e.g., sizes of physical features, electrical characteristics of physical features, etc.) of portions of integrated circuit designs.

As shown in item 152, these methods receive an integrated circuit design into a computerized device. These methods perform an analysis of the integrated circuit design in item 154 to identify characteristics of physical features of portions of the integrated circuit design, using the computerized device. Instead of always calculating sensitivities of timing values, the methods herein potentially use the look-up tables to look up the sensitivity of a timing value of a portion of the integrated circuit design. Such calculations, or look up operations, find the sensitivities of timing values to manufacturing process variables, voltage variables, and temperature variables (PVT variables), again using the computerized device.

More specifically, before determining whether to use the look-up tables in item 162, these methods evaluate relationships between the characteristics of physical features of the portion of the integrated circuit design as shown in item 156 to generate an indicator value, which is shown as item 158. For example, when evaluating the relationships between the characteristics of physical features of the portion of the integrated circuit design in item 156, these methods can calculate ratios of physical sizes, ratios of electrical values, ratios of timing values, etc., of the physical features. As described below, the indicator value 158 generated in the process is used for determining whether to look up the sensitivity of the timing value to the PVT variables in the look-up tables, or whether to calculate the sensitivity of the timing value to the PVT variables.

Therefore, as shown in decision box 162, based on whether the indicator value is within a threshold range (e.g., a table usage filter value range) these methods either calculate the sensitivity of the timing value to the PVT variables as shown in item 166, or look up a previously determined sensitivity of the timing value to the PVT variables from the look-up tables in item 164. When actually calculating the sensitivity of the timing value to the PVT variables in item 166, these methods can perform any number of calculations, including finite differences modeling, current source modeling, non-linear delay modeling, etc.

Additionally, when determining whether the indicator value is within the table usage filter value range in item 162, these methods herein can also refer to previously established sensitivity importance criteria 160. The previously established sensitivity importance criteria 160 cause the methods herein to use different table usage filter value ranges for different portions of the integrated circuit design in item 162. Therefore, these previously established sensitivity importance criteria 160 allow the analyst to tune the methods herein so that portions of the integrated circuit design that are considered critical, or that historically have an above-average number of defects, will always (or almost always) have the timing sensitivity calculated 166, instead of being looked up 164; while other less critical portions of the integrated circuit design can acceptably use the look-up tables for timing sensitivities 164. Such previously established sensitivity importance criteria 160 can be different for different physical layers of the integrated circuit design, different physical locations of the integrated circuit design, different materials within the integrated circuit design, different parameters of the PVT variables, etc.

Further, as shown in item 168, these methods can constantly update the look-up tables 150 while determining the sensitivity of the timing value to the PVT variables, thereby allowing the processes shown in FIG. 5 to be dynamic and adaptive as the analysis of the integrated circuit design proceeds. For example, these methods can update the look-up table 168 by using results from the actual timing calculations in item 166, instead of being looked up. Thus, when the sensitivity of the timing value to the PVT variables is actually calculated in item 166 (instead of being looked up in item 164), the results of such calculations 166 can update the look-up tables 168 to add additional timing sensitivities related to additional relationships between the characteristics of physical features that were not previously stored in the look-up tables 150, or such calculations can be used to refine previously stored timing sensitivities that were previously saved to the look-up tables 150.

The methods as described above can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
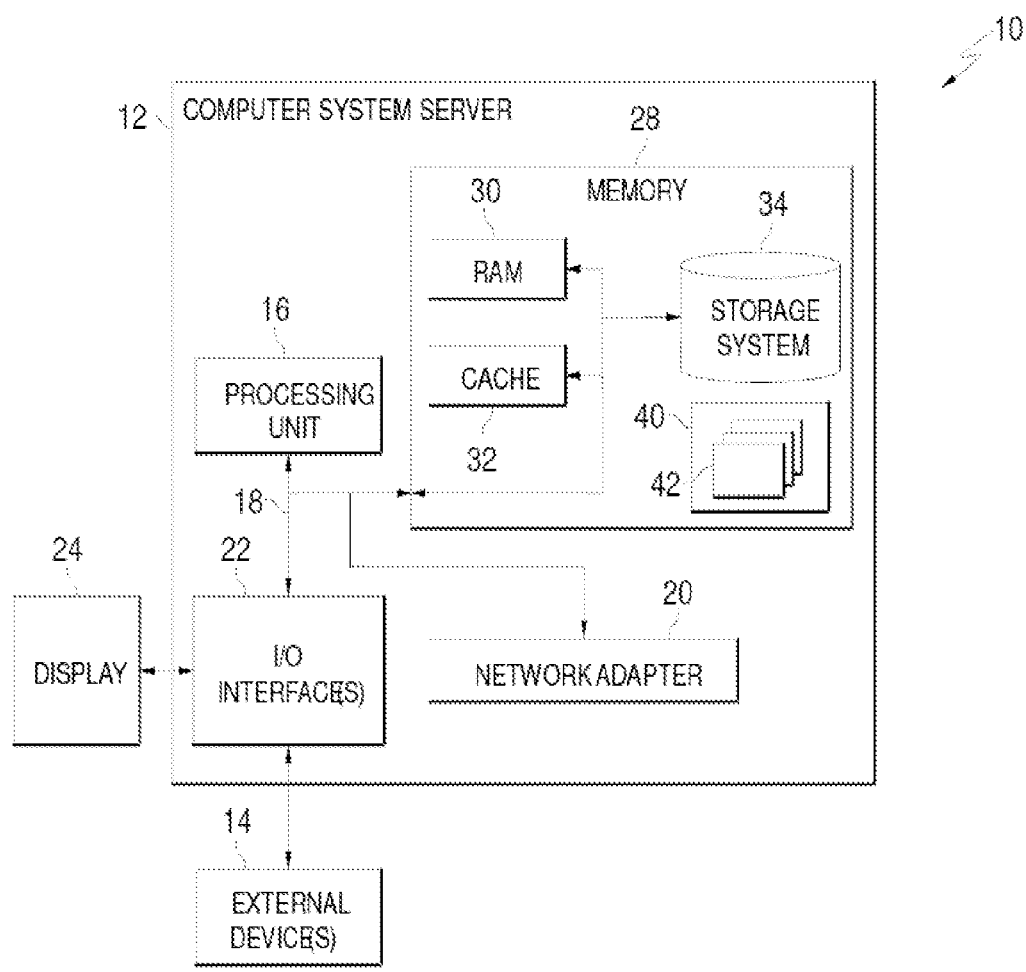
FIG. 6 is a schematic diagram showing exemplary systems herein.

A representative hardware environment (i.e., a computer system) for implementing the systems and methods herein is shown in FIG. 6. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed [systems, methods and computer program products] and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for performing a static timing analysis used in integrated circuit chip design, said method comprising:
receiving an integrated circuit design into a computerized device;
performing an analysis of said integrated circuit design to identify characteristics of physical features of portions of said integrated circuit design, using said computerized device; and
determining sensitivities of timing values of different portions, respectively, of said integrated circuit design to manufacturing process variables, voltage variables, and temperature variables (PVT variables), using said computerized device, wherein, for each portion of said integrated circuit design, a sensitivity of a timing value is determined by:
evaluating, by said computerized device, relationships between said characteristics of physical features of said portion of said integrated circuit design to generate an indicator value;
determining whether said indicator value is outside or within a table usage filter value range;
when said indicator value is outside said table usage filter value range, calculating, by said computerized device, a calculated sensitivity value for said sensitivity of said timing value to said PVT variables; and
when said indicator value is within said table usage filter range, looking up, by said computerized device, a previously determined sensitivity value for said sensitivity of said timing value to said PVT variables from a look-up table, wherein said look-up table is stored in a memory that is accessible by said computerized device and wherein using said look-up table reduces a runtime and memory requirements for said static timing analysis while maintaining accuracy.

2. The method according to claim 1, said determining of said sensitivities comprising: using previously established sensitivity importance criteria to use different table usage filter value ranges for different portions of said integrated circuit design.

3. The method according to claim 2, said previously established sensitivity importance criteria being different for at least one of:
different physical layers of said integrated circuit design;
different physical locations of said integrated circuit design;
different materials within said integrated circuit design; and
different parameters of said PVT variables.

4. The method according to claim 1, said evaluating of said relationships between said characteristics of physical features of said portion of said integrated circuit design comprising calculating ratios of physical sizes, electrical values, and timing values of said physical features.

5. The method according to claim 1, further comprising updating said look-up table during determining of said sensitivity of said timing value to said PVT variables.

6. The method according to claim 5, said updating using results from said calculating of said calculated sensitivity value for said sensitivity of said timing value to said PVT variables to update said look-up table.

7. The method according to claim 1, said calculating of said calculated sensitivity value for said sensitivity of said timing value to said PVT variables comprising one of:
finite differences modeling;
current source modeling; and
non-linear delay modeling.

8. A method for performing a static timing analysis used in integrated circuit chip design, said method comprising:
creating a look-up table of previously determined timing value sensitivity with respect to characteristics of physical features of portions of integrated circuit designs and storing said look-up table in a memory accessible by a computerized device;
receiving an integrated circuit design into said computerized device;
performing an analysis of said integrated circuit design to identify characteristics of physical features of portions of said integrated circuit design, using said computerized device; and
determining sensitivities of timing values of different portions, respectively, of said integrated circuit design to manufacturing process variables, voltage variables, and temperature variables (PVT variables), using said computerized device, wherein, for each portion of said integrated circuit design, a sensitivity of a timing value is determined by:
evaluating, by said computerized device, relationships between said characteristics of physical features of said portion of said integrated circuit design to generate an indicator value;
determining whether said indicator value is outside or within a table usage filter value range;
when said indicator value is within said table usage filter value range, calculating, by said computerized device, a calculated sensitivity value for said sensitivity of said timing value to said PVT variables; and
when said indicator value is within said table usage filter range, looking up a previously determined sensitivity value for said sensitivity of said timing value to said PVT variables from said look-up table, wherein using said look-up table reduces a runtime and memory requirements for said static timing analysis while maintaining accuracy.

9. The method according to claim 8, said determining of said sensitivities comprising: using previously established sensitivity importance criteria to use different table usage filter value ranges for different portions of said integrated circuit design.

10. The method according to claim 9, said previously established sensitivity importance criteria being different for at least one of:
different physical layers of said integrated circuit design;
different physical locations of said integrated circuit design;
different materials within said integrated circuit design; and
different parameters of said PVT variables.

11. The method according to claim 8, said evaluating of said relationships between said characteristics of physical features of said portion of said integrated circuit design comprising calculating ratios of physical sizes, electrical values, and timing values of said physical features.

12. The method according to claim 8, further comprising updating said look-up table during determining of said sensitivity of said timing value to said PVT variables.

13. The method according to claim 12, said updating using results from said calculating of said calculated sensitivity value for said sensitivity of said timing value to said PVT variables to update said look-up table.

14. The method according to claim 8, said calculating of said calculated sensitivity value for said sensitivity of said timing value to said PVT variables comprising one of:
finite differences modeling;
current source modeling; and
non-linear delay modeling.

15. A computer program product for performing an analysis, the computer program product comprising a computer readable storage medium having program instructions embodied therewith, wherein the computer readable storage medium is not a transitory signal per se, the program instructions being executable by a computerized device to cause the computerized device to perform a method for performing a static timing analysis used in integrated circuit chip design, the method comprising:
creating a look-up table of previously determined timing value sensitivity with respect to characteristics of physical features of portions of integrated circuit designs and storing said look-up table in a memory accessible by said computerized device;
receiving an integrated circuit design into said computerized device;
performing an analysis of said integrated circuit design to identify characteristics of physical features of portions of said integrated circuit design, using said computerized device; and
determining sensitivities of timing values of different portions, respectively, of said integrated circuit design to manufacturing process variables, voltage variables, and temperature variables (PVT variables), using said computerized device, wherein, for each of portion of said integrated circuit design, a sensitivity of a timing value is determined by:
evaluating relationships between said characteristics of physical features of said portion of said integrated circuit design to generate an indicator value;
determining whether said indicator value is outside or within a table usage filter value range;
when said indicator value is outside said table usage filter value range, calculating a calculated sensitivity value for said sensitivity of said timing value to said PVT variables; and when said indicator value is within said table usage filter range, looking up a previously determined sensitivity value for said sensitivity of said timing value to said PVT variables from said look-up table, wherein using said look-up table reduces a runtime and memory requirements for said static timing analysis while maintaining accuracy.

16. The computer program product according to claim 15, said determining of said sensitivities comprising: using previously established sensitivity importance criteria to use different table usage filter value ranges for different portions of said integrated circuit design.

17. The computer program product according to claim 16, said previously established sensitivity importance criteria being different for at least one of:

different physical layers of said integrated circuit design;

different physical locations of said integrated circuit design;

different materials within said integrated circuit design; and different parameters of said PVT variables.

18. The computer program product according to claim 15, said evaluating of said relationships between said characteristics of physical features of said portion of said integrated circuit design comprising calculating ratios of physical sizes, electrical values, and timing values of said physical features.

19. The computer program product according to claim 15, further comprising updating said look-up table during determining of said sensitivity of said timing value to said PVT variables.

20. The computer program product according to claim 19, said updating using results from said calculating of said calculated sensitivity value for said sensitivity of said timing value to said PVT variables to update said look-up table.

* * * * *